(12) United States Patent
Ragnarsson

(10) Patent No.: US 6,562,303 B1
(45) Date of Patent: May 13, 2003

(54) METHOD AND APPARATUS FOR TREATING FLUE GAS

(75) Inventor: Sven Ragnarsson, Ingelstad (SE)

(73) Assignee: Alstom Power Sweden Holding AB, Finspang (SE)

( * ) Notice: Subject to any disclaimer, the term of this patent is extended or adjusted under 35 U.S.C. 154(b) by 0 days.

(21) Appl. No.: 09/293,181

(22) Filed: Apr. 16, 1999

Related U.S. Application Data

(63) Continuation of application No. PCT/SE97/01609, filed on Sep. 25, 1997.

(30) Foreign Application Priority Data

Oct. 17, 1996 (SE) ................................................ 9603818

(51) Int. Cl.$^7$ .......................... B01D 53/78; B01D 53/68; B01D 53/50
(52) U.S. Cl. ....................... 422/171; 422/170; 422/172; 422/205; 96/366; 96/367
(58) Field of Search ................................ 422/169–172, 422/224, 205; 96/366, 367

(56) References Cited

U.S. PATENT DOCUMENTS 3,696,590 A * 10/1972 Richmond .................... 96/228
4,305,909 A * 12/1981 Willett et al. ................ 422/169

FOREIGN PATENT DOCUMENTS

| DE | 4112750 | 10/1992 |
|---|---|---|
| EP | 0613713 | 9/1994 |
| SE | 443725 | 3/1986 |
| WO | 9616721 | 6/1996 |
| WO | 9709111 | 3/1997 |

* cited by examiner

Primary Examiner—Hien Tran
(74) Attorney, Agent, or Firm—Birch, Stewart, Kolasch & Birch, LLP

(57) ABSTRACT

A method and an apparatus for treating flue gas by injection of an aqueous liquid in the form of droplets and subsequent separation thereof are described. In the treatment, the flue gas and droplets are conducted towards a baffle means, on which droplets are deposited and form a liquid film, and the flue gas is made to pass through the liquid film. The apparatus comprises a quencher having an inlet for the flue gas, nozzles for injecting an aqueous liquid in the form of droplets into the flue gas, and an outlet for the flue gas. The apparatus is characterized in that a baffle means is arranged in the path of flow in the flue gas for depositing liquid droplets and forming a liquid film, and that deflection means are arranged under the baffle means.

12 Claims, 1 Drawing Sheet

METHOD AND APPARATUS FOR TREATING FLUE GAS

This application is a Continuation of PCT International Application No. PCT/SE97/01609 filed on Sep. 25, 1997, which designated the United States, and on which priority is claimed under 35 U.S.C. § 120, the entire contents of which are hereby incorporated by reference.

The present invention relates to a method and an apparatus for treating flue gas, and more specifically to the treatment of a flue gas in a wet-cleaning apparatus, which comprises a so-called quencher or cooler.

Flue gases forming in the incineration of materials such as refuse, coal, oil etc, contain impurities which must be removed before the flue gases are released into the atmosphere. Thus, for instance flue gases from refuse incineration contain, among other things, hydrogen chloride and sulphur dioxide which are removed by wet cleaning in a wet-cleaning apparatus. The wet-cleaning apparatus, also referred to as a scrubber, operates in one or more steps with liquid as separating medium. In order to achieve a high degree of efficiency in the wet cleaning, it is preferred to finely divide the liquid. Furthermore, the liquid is often water-based and may contain an agent to improve the absorption of impurities in the gas.

When treating flue gases containing both hydrogen chloride and sulphur dioxide, such as flue gases from refuse incineration, the scrubber comprises one step for removing hydrogen chloride and a subsequent step for removing sulphur dioxide. Adjacent to the inlet of the scrubber and before the hydrogen chloride step a so-called quencher or cooler is arranged, into which finely-divided liquid is injected for cooling the hot flue gas. During cooling, part of the liquid is evaporated such that the flue gas is saturated with liquid. After this saturation quenching of the hot flue gas in the quencher, the flue gas is passed onto an absorption tower for removing hydrogen chloride and, optionally, also sulphur dioxide.

In a frequent design of a scrubber, the quencher or cooler consists of a vertical tower, which has an inlet for flue gas at the upper end, nozzles for injecting finely-divided liquid, and a horizontal outlet arranged at the bottom and connected to an absorption tower with a step for absorption of hydrogen chloride and usually also a subsequent step for absorption of sulphur dioxide. In the outlet of the quencher there is a so-called droplet separator for separation of remaining liquid droplets from the flue gas. This droplet separator may consist of e.g. lamellae, between which the flue gas must pass, whereby the remaining liquid droplets are deposited on the lamellae. The droplet separator may be provided with e.g. a netting instead of lamellae.

A great drawback of such vertically arranged droplet separators is that a thick coating builds up gradually on the droplet separator. This coating originates from disolved and suspended material in the liquid droplets that are separated in the droplet separator. When the liquid in the separated droplets is evaporated, the dissolved and suspended material is deposited as a coating on the droplet separator. In order to counteract the formation of such coating, nozzles are arranged adjacent to the droplet separator for spraying it with liquid, but it is difficult for these nozzles to wet the entire surface of the droplet separator and besides they are operated only intermittently, which results in the surface of the droplet separator not being continuously wetted, but having alternating wet and dry portions. This results, in turn, in the above-mentioned undesired build-up of a coating. When the coating has attained a certain thickness, the droplet separator must be removed and cleaned, thus causing service interruption. Although this service interruption can be minimised by replacing the coated droplet separator with a new, uncoated droplet separator, the labour-consuming cleaning of the coated droplet separator remains.

Theoretically it would be possible to reduce or eliminate the coating on the droplet separator by using clean water when injecting liquid into the quencher and when spraying the droplet separator. In actual practice, this is however not possible since it would result in the formation of a very large volume of waste water having a low concentration of impurities. Such low-concentrated waste water is very labour-consuming and expensive to clean and also cannot be directly discharged into a water course. In the operation of a quencher of the above-described type, one therefore endeavours to use as concentrated an aqueous solution as possible for cooling and spraying of the droplet separator, thereby keeping the liquid volume and, thus, the need of cleaning at a minimum. The higher concentration of the dissolved and suspended substances contained in the aqueous solution, the greater the risk of a coating being built up on the droplet separator, especially if this is not completely wetted but has alternating dry and wet portions.

A further drawback of scrubbers of the above-described type, provided with a quencher, is that they require a large space and are difficult to manufacture. Thus, the cooling tower for a conventional scrubber, which is designed for a gas flow rate of 100,000 $Nm^3/h$, has a diameter of about 3.5 m and a height of about 13 m. The quencher and the absorption tower of the scrubber, which are usually made of glass-fibre reinforced plastic, certainly have a cylindrical cross-section, but in the transition between the cooling tower and the absorption tower there are a number of alternating straight and curved surfaces which are difficult to form.

When treating flue gases in a scrubber with a so-called quencher or cooler, there is thus a need of reducing or eliminating the above-described formation of a coating. There is a also a need of a scrubber, which is easy to manufacture and requires but a small space.

In the present invention, it has been discovered that if, instead of a conventional, vertically arranged droplet separator, the liquid injected into the flue gas is used to form a liquid film, through which the flue gas then passes, the formation of a coating, which takes place according to prior-art, will be reduced or eliminated.

More specifically, the invention provides a method for treating flue gas, in which an aqueous liquid is injected in the form of droplets into the flue gas, whereupon flue gas and liquid droplets are separated, said method being characterised in that the flue gas and the droplets are conducted towards a baffle means, on which droplets are deposited and form a liquid film, and that the flue gas is made to pass through the liquid film.

The invention also provides an apparatus for treating flue gas by injection of an aqueous liquid in the form of droplets and subsequent separation thereof, said apparatus comprising a quencher having an inlet for the flue gas, nozzles for injecting an aqueous liquid in the form of droplets into the flue gas, and an outlet for the flue gas, said apparatus being characterised in that a baffle means is arranged in the path of flow of the flue gas for depositing droplets and forming a liquid film, and that deflection means are arranged under the baffle means.

Further distinctive features and advantages of the invention will appear from the following specification and the appended claims.

The baffle means, on which the liquid film forms, may be of varying design, but suitably consists of a surface which is arranged essentially horizontally or transversely of the direction of the flow of the flue gas. Preferably, this surface is curved upwards and has the shape of a cylinder jacket, such as e.g. half of a cylinder jacket, the cylinder jacket being essentially horizontally arranged in the quencher, the convex surface being directed upwards. Alternatively, but at present less preferred, the baffle means may consist of two flat surfaces which are interconnected along a lateral edge and which together form an upwardly acute angle, corresponding to the angle of the roof of a house.

The liquid film formed on the baffle means flows along the surface of the baffle means and falls as a liquid film from the lateral edges of the baffle means. The flue gas passes through this falling liquid film, whereby remaining liquid droplets in the flue gas are separated. For the flue gas to pass through the falling liquid film, the flue gas which originally flows vertically downwards must change its direction of flow by at least 90°. To this end, there are suitably arranged under the baffle means so-called deflection means, which preferably consist of essentially horizontal lamellae, which suitably are inclined relative to the horizontal plane. The deflection means serve to deflect the direction of flow of the flue gas to be changed by at least about 90°, preferably about 120–160°, and most preferred about 150°. A further function of the deflection means is to contribute to the liquid film preferably remaining continuous. To achieve this, the deflection means, for instance in the cases where they consist of essentially horizontal, inclined lamellae, make an angle of at least about 0°, preferably about 30–80°, most preferred about 60°, with the horizontal plane seen in the direction away from the inlet of the quencher towards the outlet thereof, i.e. seen in the direction of flow of the gas. Moreover, the deflection means should be arranged successively at such a distance from each other that the liquid film preferably remains continuous and is not divided into separate liquid flows.

The deflection means can be arranged straight under each other, but can also be successively offset in relation to the vertical plane through the circumferential edge of the baffle means. The degree of offset is such that the uppermost deflection means is least offset in relation to said vertical plane, while the lowermost deflection means is most offset in relation to the vertical plane. Independently of how the deflection means are positioned in relation to each other and to the circumferential edge of the baffle means seen in the vertical direction, they should always be arranged such that the liquid film falling from the baffle means hits the deflection means in turns from the top downwards.

By the flue gas changing its direction of flow when passing through the liquid film and between the deflection means, a centrifugal effect is obtained, contributing to the separation of remaining liquid droplets in the flue gas. The higher the flow rate of the flue gas, the greater the centrifugal effect. The flow rate of the flue gas, however, cannot be too high since this would involve a risk that the liquid film will be torn apart. A suitable flow rate of the flue gas when passing the liquid film is about 1–5 m/s, preferably about 2–4 m/s.

The above-described baffle and deflection means are according to the invention so arranged as to surround the quencher outlet, which preferably is located in the lower part of the quencher and arranged for essentially horizontal discharge of the flue gas.

The liquid separated on the baffle means and forming the downwards flowing liquid film is collected at the bottom of the quencher and recirculated from there with the aid of a circulation pump to the spray nozzles positioned in the upper part of the quencher. The bottom of the quencher is also provided with an outlet for drawing off liquid, and in the supply conduit to the nozzles there is a connection for supplying fresh water. As mentioned above, one endeavours to keep the circulating liquid at as high a concentration as possible in respect of dissolved and suspended substances, i.e. one endeavours to minimise the drawing-off of polluted liquid as well as the supply of fresh water.

As indicated above and as will be evident from the following specification, the apparatus according to the present invention is in its preferred embodiment of a simpler design than the above-mentioned scrubber according to prior art. Like in the known scrubber, the quencher and the absorption tower in the inventive scrubber are of cylindrical cross-section, but in contrast to the known scrubber, the transition between the quencher and the absorption tower in the inventive scrubber consists of a cylindrical pipe only, which is inserted into the quencher and the absorption tower, respectively. In the inventive apparatus, there are thus no transitions between alternating straight and curved surfaces. Moreover, the outlet pipe preferably projects into the quencher, and by cutting off the lower circle segment of the projecting part, the remaining cylindrical circle segment constitutes the baffle means on which the droplets are deposited to form a continuous liquid film.

The inventive apparatus also requires a smaller space than an equivalent apparatus according to prior art. In a scrubber according to the invention, which is intended for a flue gas flow rate of about 100,000 $Nm^3/h$, the quencher thus has a height of about 9 m and consists of an upper narrower cylindrical part with a diameter of about 3 m and a lower thicker cylindrical part with a diameter of about 4.5 m. Although the lower part of the quenching tower has a larger diameter than the quenching. tower of the above-described prior-art scrubber, the centre distance between the quencher and the absorption tower can be reduced by 30% in the inventive scrubber compared with the mentioned prior-art scrubber.

By the deflection means according to the present invention being arranged inside the quencher, a more efficient separation of liquid droplets is achieved compared with a prior-art quencher, in which the droplet separator is arranged vertically in the outlet of the quencher. Through calculations, it has been possible to establish that a quencher according to the invention, in which the deflection means consist of essentially horizontal, inclined lamellae arranged in the quencher below a semicylindrical baffle means, has a degree of separation for liquid droplets with a diameter of 50 $\mu m$ of 99.7%, whereas a quencher of a known type with a droplet separator provided with lamellae and arranged vertically in the outlet pipe has a degree of separation of 93.5% under otherwise equivalent conditions in respect of flue gas flow rate, lamella angle, lamella distance, lamella width and the number of rows of lamellae. The effect of the falling liquid film according to the invention is not taken into consideration. Consequently, it is obvious that the degree of separation for liquid droplets is essentially higher in the invention than in a quencher according to prior-art technique.

Also regarding the separation of impurities in the flue gas, the invention entails an improvement thanks to the larger absorption area. When comparing a quencher of a conventional scrubber for a flue gas flow rate of 100,000 $Nm^3/h$ and an inventive quencher in a scrubber for the same flue gas flow rate, it may be established that the absorption area of the conventional quencher is about 35 $m^2$, while the absorption area of the inventive quencher is about 75 $m^2$, of which about 30 m² originate from the area consisting of the falling liquid film. The absorption area in the invention thus is more than twice as large, which means that more than twice the amount of impurities can be absorbed from the flue gas in the invention compared with the conventional quencher. For instance, in connection with flue gas from refuse incineration, which contains hydrogen chloride and sulphur dioxide, this results in the absorption of hydrogen chloride becoming so efficient even in the quencher that the hydrogen chloride absorption step which normally follows after the quencher can be excluded. This means in turn that the absorption tower in the scrubber, which follows after the quencher and which normally contains first a hydrogen chloride absorption step and then a sulphur dioxide absorption step, can be simplified to contain a sulphur dioxide absorption step only. Owing to this simplification, the height of the absorption tower will be smaller and, besides, its design may be further simplified by the fact that the special recirculation container for washing liquid which is normally required in the sulphur dioxide absorption step can be omitted, and instead this washing liquid is collected in the bottom of the absorption tower. Furthermore, no circulation pump for circulation of washing liquid in the hydrogen chloride absorption step is required. In brief, it may be said that the conventional hydrogen chloride absorption step can be eliminated in the invention.

BRIEF DESCRIPTION OF THE DRAWINGS

With a view to further illustrating the invention, it will now be described with reference to the accompanying drawings, in which.

Figure 1:
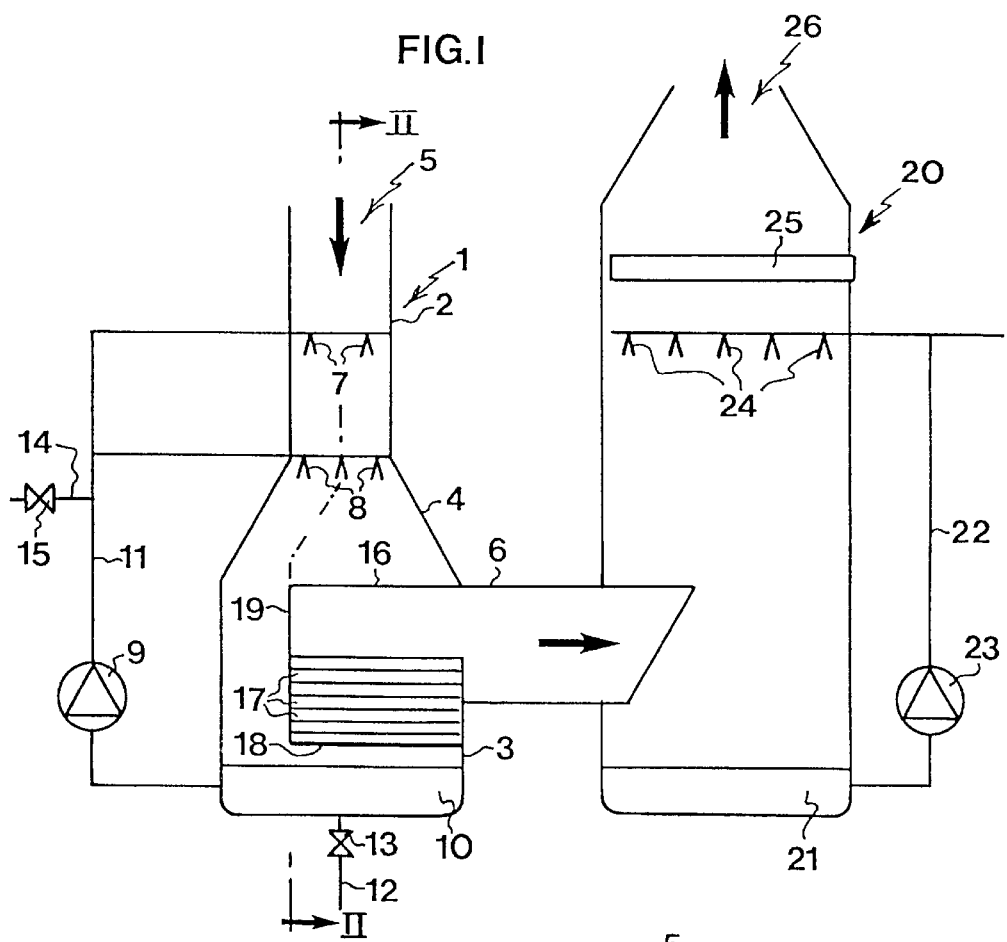
FIG. 1 is a schematic side view of a scrubber with a quencher according to the invention.
Figure 2:
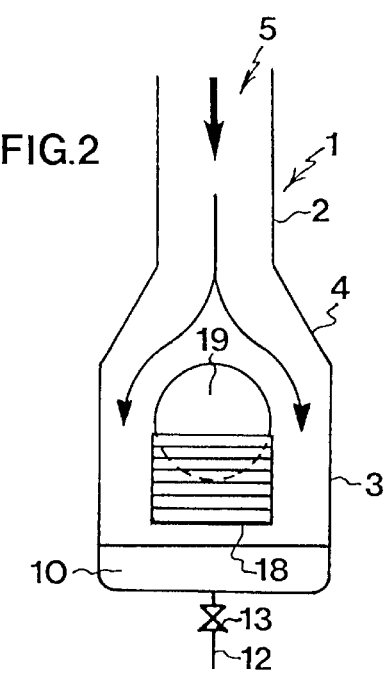
FIG. 2 is a view of the quencher in FIG. 1 seen along line II—II.

The inventive apparatus illustrated in FIGS. 1 and 2 consists of a quencher 1, which is made of a corrosion-proof material, preferably glass-fibre reinforced plastic. The quencher consists of an upper cylindrical part 2 and a lower cylindrical part 3, the lower cylindrical part having a larger diameter than the upper cylindrical part. The upper and lower parts are united by a conical portion 4. The quencher 1 has an inlet 5 for flue gas, which is to be treated in the quencher, and an outlet 6 for treated flue gas. In the upper part of the quencher there are nozzles 7, 8 for injection of a finely-divided aqueous liquid into the flue gas. The nozzles are supplied with the aqueous liquid with the aid of a circulation pump 9, which pumps liquid from the bottom 10 of the quencher through a conduit 11 to the nozzles 7, 8. In the bottom of the quencher there is an outlet 12 with a valve 13 for drawing off liquid. Moreover, the conduit 11 is connected to a fresh water conduit 14, which is provided with a valve 15.

In the lower part of the quencher 1 there is a baffle means 16, which in the shown preferred case consists of the outlet conduit 6. That part of the outlet conduit 6 which projects into the lower part of the quencher 1 is cut off such that only its upper, upwards curved semi-cylindrical portion is left, and it is this part that constitutes the baffle means 16. In connection with the peripheral edges of the baffle means 16 and below these edges there are lamellae 17 which are essentially horizontally arranged and inclined relative to the horizontal plane. In the embodiment illustrated, the lamellae are vertically arranged under each other and surround three of the lateral edges of the baffle means 16. The lamellae are inclined at an angle of preferably about 60° to the horizontal plane, seen in the direction of flow of the flue gas. Under the lamellae 17 there is a flat cover plate 18. Moreover, there is a cover plate for the end portion 19 between the baffle means 16 and the lamellae 17. These cover plates are adapted to force the flue gas to pass between the lamellae 17 in order to reach the outlet 6.

When treating a flue gas, the quencher functions as follows.

The flue gas is introduced into the inlet 5 at the upper cylindrical part 2 of the quencher, where the hot flue gas is cooled by injection of an aqueous cooling liquid through nozzles 7, 8 which are arranged in two rows above each other. During cooling, part of the injected liquid droplets are evaporated and the heat for evaporation thereof is taken from the flue gas which is thus cooled. By the injection of liquid, the flue gas is saturated with liquid. Besides, there are unevaporated liquid droplets in the flue gas.

While flowing downwards in the quencher 1, the flue gas enters the conical portion 4 of the quencher, and then hits the baffle means 16, which in the shown case consists of the upper semicylindrical part of the outlet 6. When the flue gas hits the baffle means 16, liquid droplets in the flue gas are deposited as a film on the baffle means, and this film then flows downwards along the baffle means and via the peripheral edges thereof down onto the lamellae 17 arranged therebelow. The liquid film flowing from the peripheral edges of the baffle means is continuous, and the distance to the closest lamellae 17, and to the following lamellae, is preferably such that the liquid film on its way downwards from lamella to lamella appears as a continuous liquid film.

The flue gas is deflected by the baffle means 16 and flows along and around this, as indicated by the arrows in FIG. 2, so as then to flow through the falling liquid film and between the lamellae 17 and finally leave through the outlet 6. In order to force the flue gas to pass the liquid film and the lamellae 17, the end portion 19 and the space below the lamellae 17 are provided with cover plates.

Since the lamellae are inclined relative to the horizontal plane by preferably about 60°, the flue gas is forced, when passing through the liquid film and between the lamellae, to change its direction by about 120°. This sudden change of direction produces a centrifugal force which contributes to the separation of any remaining liquid droplets in the flue gas. The elimination of remaining liquid droplets in the flue gas is secured as the flue gas passes through the liquid film between the lamellae 17.

The falling liquid film is collected at the bottom 10 of the quencher and there forms a store of liquid, which by means of the circulation pump 9 is recirculated to the nozzles 7, 8.

As an increasing amount of impurities in the form of dissolved substances and particles from the flue gas is collected in the liquid on the bottom 10 of the quencher, liquid can be drawn off through the outlet conduit 12 via the valve 13. The drawn-off liquid can then be cleaned in a cleaning plant. With a view to compensating for drawn-off liquid and liquid evaporated in the flue gas there is a conduit 14 with a valve 15 for supplying fresh water.

Thanks to the above-described design of the quencher according to the invention, in which the droplet separation surfaces are wetted with a continuous liquid film, problems with the forming of a coating in connection with droplet separators in conventional quenchers will be efficiently counteracted.

Moreover, by the absorption surface in the inventive quencher, as indicated above, being more than twice as large as that of a comparable conventional quencher, such a high degree of absorption of hydrogen chloride in the quencher from a hydrogen-chloride-containing flue gas is achieved that the hydrogen chloride absorption step that is available in a conventional scrubber after the quencher can be eliminated in the invention. In a preferred design of the apparatus according to the invention, the outlet 6 of the quencher is therefore connected directly to the sulphur dioxide absorption tower of the scrubber. As mentioned above, this results in a considerable simplification of the construction of the scrubber. In addition to the possibility of thus excluding the conventional hydrogen chloride absorption step from the absorption tower, the recirculation container for washing liquid that is normally to be found in the sulphur dioxide absorption step can also be excluded, and instead the washing liquid is collected from the sulphur dioxide absorption step on the bottom of the absorption tower. As shown in FIG. 1, the absorption tower 20 will have a design comprising a store 21 for washing liquid at the bottom of the tower, a conduit 22 with a circulation pump 23 for circulation of washing liquid to the nozzles 24 for injection of finely-divided washing liquid into the upwards flowing flue gas, and a droplet separator 25 for separation of liquid droplets from the flue gas before the cleaned flue gas is discharged through the outlet 26 of the absorption tower.

What is claimed is:

1. Apparatus for treatment of flue gas by injection of aqueous liquid in the form of droplets and subsequent separation thereof, which comprises:

1) a quencher comprising a vertical tower having inlet means for flue gas in the upper portion of the tower, and a first outlet means in the lower portion of the tower for the removal of the flue gas, 2) baffle means whose outer surface is arranged in the path of flow of the flue gas within the interior the tower, 3) means for depositing droplets of aqueous liquid on the surface of the baffle means thereby to form a liquid film on said surface of the baffle means and forming a downwards flowing liquid film, and 4) deflection means arranged under the baffle means, wherein said baffle means is arranged horizontally or transversely of the direction of the flow of the flue gas and said deflection means are adapted to change the direction of flow of the flue gas by at least about 90° and up to 160° and make it pass through the falling liquid film, and 5) a second outlet means beneath the baffle means and the deflection means, for removal of aqueous liquid collected in the bottom of the quencher.

2. An apparatus as claimed in claim 1, characterized in that the baffle means constitutes a part of a cylinder jacket.

3. An apparatus as claimed in claim 1, characterized in that the deflection means consist of essentially horizontal, inclined lamellae.

4. An apparatus as claimed in claim 1, characterized in that the baffle means and the deflection means surround the first outlet means of the quencher.

5. An apparatus as claimed in claim 1, characterized in that the first outlet means of the quencher is connected to a sulphur dioxide absorption tower.

6. An apparatus as claimed in claim 2, characterized in that the deflection means consist of essentially horizontal, inclined lamellae.

7. An apparatus as claimed in claim 2, characterized in that the baffle means and the deflection means surround the first outlet means of the quencher.

8. An apparatus as claimed in claim 3, characterized in that the baffle means and the deflection means surround the first outlet means of the quencher.

9. An apparatus as claimed in claim 2, characterised in that the first outlet means of the quencher is connected to a sulphur dioxide absorption tower.

10. An apparatus as claimed in claim 3, characterised in that the first outlet means of the quencher is connected to a sulphur dioxide absorption tower.

11. An Apparatus as claimed in claim 4, characterised in that the first outlet means of the quencher is connected to a sulphur dioxide absorption tower.

12. The apparatus as claimed in claim 1, wherein the deflection means consist essentially of horizontal, inclined lamellae which are arranged to form an angle of at least about 0° to 80° with the horizontal plane seen in the direction away from the inlet of the quencher toward the first outlet means.

* * * * *